US009638926B2

(12) United States Patent
Li et al.

(10) Patent No.: US 9,638,926 B2
(45) Date of Patent: May 2, 2017

(54) STEREO PROJECTION APPARATUS AND STEREO PROJECTION SYSTEM WITH LOW THROW RATIO AND HIGH LIGHT EFFICIENCY

(71) Applicant: Shenzhen Time Waying Technology Co., Ltd., Shenzhen, Guangdong (CN)

(72) Inventors: Yanlong Li, Guandong (CN); Xianjun Deng, Guangdong (CN); Yetong Wang, Guangdong (CN)

(73) Assignee: Shenzhen Time Waying Technology Co., Ltd., Shenzhen, Guangdong (CN)

( * ) Notice: Subject to any disclaimer, the term of this patent is extended or adjusted under 35 U.S.C. 154(b) by 192 days.

(21) Appl. No.: 14/580,769

(22) Filed: Dec. 23, 2014

(65) Prior Publication Data

US 2015/0109539 A1    Apr. 23, 2015

Related U.S. Application Data

(63) Continuation of application No. PCT/CN2014/070688, filed on Jan. 15, 2014.

(30) Foreign Application Priority Data

Sep. 5, 2013  (CN) .................... 2013 2 0549548 U

(51) Int. Cl.
  *G02B 27/26*      (2006.01)
  *H04N 13/04*      (2006.01)
  (Continued)

(52) U.S. Cl.
  CPC ......... *G02B 27/26* (2013.01); *H04N 13/0434* (2013.01); *H04N 13/0459* (2013.01); *G02B 5/3016* (2013.01); *G02B 27/285* (2013.01)

(58) Field of Classification Search
  CPC .... G03B 21/26; G03B 21/28; G03B 21/2033; G03B 21/2053; H04N 13/0434;
  (Continued)

(56) References Cited

U.S. PATENT DOCUMENTS

| 7,714,945 B2* | 5/2010 | Tan ....................... G02B 5/3058 349/117 |
| 2008/0049191 A1* | 2/2008 | Endo ...................... G03B 21/14 353/22 |
| 2012/0147280 A1* | 6/2012 | Osterman .............. G02B 27/26 349/9 |

FOREIGN PATENT DOCUMENTS

| CN | 201203713 | 3/2009 |
| CN | 101398536 | 4/2009 |

(Continued)

OTHER PUBLICATIONS

International Search Report of PCT/CN2014/070688 dated Jun. 11, 2014, 12 pages.

*Primary Examiner* — Sultan Chowdhury
(74) *Attorney, Agent, or Firm* — Rankin, Hill & Clark LLP

(57) ABSTRACT

A stereo projection apparatus includes a polarized beam splitter assembly for splitting a projecting light beam; a polarization state transforming assembly for adjusting the polarization state of the transmitted light beam or the polarization state of the first and second reflective beam; a light path direction adjustment assembly for adjusting a travel direction of the transmitted light beam or a travel direction of the first and the second reflective light beam; a light beam size adjustment assembly for adjusting a coverage range of the transmitted light beam or a coverage range of the first and the second reflective light beam; and a light (Continued)

modulator for modulating the adjusted transmitted light beam, first reflective light beam and second reflective light beam.

16 Claims, 3 Drawing Sheets

(51) Int. Cl.
*G02B 5/30* (2006.01)
*G02B 27/28* (2006.01)

(58) Field of Classification Search
CPC ........... H04N 13/0438; H04N 13/0459; H04N 9/3105; H04N 9/3167
See application file for complete search history.

(56) References Cited

FOREIGN PATENT DOCUMENTS

| | | |
|---|---|---|
| CN | 203025425 | 6/2013 |
| JP | 2007328067 | 12/2007 |

* cited by examiner

STEREO PROJECTION APPARATUS AND STEREO PROJECTION SYSTEM WITH LOW THROW RATIO AND HIGH LIGHT EFFICIENCY

FIELD

The present invention relates to stereo projection technology and, more particularly, to a stereo projection apparatus and stereo projection system with low throw ratio and high light efficiency.

BACKGROUND

In Chinese Patent No. 201220746320.8, entitled "high light efficiency light modulation apparatus and high light efficiency stereo projection system", a large-sized polarized beam splitter device is required to split an incident light into a transmitted light beam and a reflective light beam and then adjust the polarization state of the light beams to make the two light beams overlap on a metal screen. This technology results in a long light path and hence requires large-sized optical devices. When a low throw ratio projector is used, each optical device needs to have a very large size, and overlapping of the two beams of light also becomes very difficult. In addition, there are difficulties in device manufacture and assembly as well as mass production of the projector.

What is needed, therefore, is an improved projection apparatus to overcome the above defects.

SUMMARY

Accordingly, the present invention is directed to a stereo projection apparatus and stereo projection system with low throw ratio and high light efficiency, which can address the problem that the size of the existing projection apparatus is unduly large.

The present invention provides a stereo projection apparatus with low throw ratio and high light efficiency, comprising:

a polarized beam splitter assembly configured to split a projecting light beam of a projector into a transmitted light beam, a first reflective light beam and a second reflective light beam, the polarization direction of the transmitted light beam being orthogonal to the polarization direction of the first reflective light beam and the second reflective light beam;

a polarization state transforming assembly configured to adjust the polarization state of the transmitted light beam or the polarization state of the first reflective light beam and the second reflective beam, such that the adjusted transmitted light beam, first reflective light beam and second reflective light beam have the same polarization state;

a light path direction adjustment assembly configured to adjust a travel direction of the transmitted light beam or a travel direction of the first reflective light beam and the second reflective light beam, such that the adjusted transmitted light beam, first reflective light beam and second reflective light beam have the same travel direction;

a light beam size adjustment assembly configured to adjust a coverage range of the transmitted light beam or a coverage range of the first reflective light beam and the second reflective light beam, such that projecting images of the adjusted transmitted light beam, first reflective light beam and second reflective light beam have the same size; and a light modulator configured to modulate the adjusted transmitted light beam, first reflective light beam and second reflective light beam to left-circularly polarized light and right-circularly polarized light in accordance with a frame sequence.

Further, the polarized beam splitter assembly is a polarized beam splitter prism set. The polarized beam splitter prism set comprises three 45-degree prisms that are attached to each other after a prism coating process. The polarized beam splitter prism set is rectangular-shaped and comprises one incident plane and three emitting planes. There are two polarization splitting planes inside the polarized beam splitter prism set, which are perpendicular to each other and both are at a 45-degree angle to the incident plane and the two polarization splitting planes intersect at a center line of the incident plane.

Further, the polarization state transforming assembly comprises at least one twisted liquid crystal device; the twisted liquid crystal device is disposed on the light paths of the first reflective light beam and second reflective light beam and in front of or after the light path direction adjustment assembly, or disposed at any location after the light beam size adjustment assembly and in front of the light modulator.

Further, the twisted liquid crystal device is one of a glass-substrate-based liquid crystal device, a flexible-plastic-substrate-based liquid crystal device, and a macromolecule liquid crystal film based on polymer technology.

Further, the light path direction adjustment assembly comprises two reflective mirrors respectively disposed on light paths of the first reflective light beam and the second reflective light beam.

Further, the light beam size adjustment assembly comprises at least one lens or lens group, the lens or lens group is disposed at any location on the light paths of the transmitted light beam, first reflective light beam and second reflective light beam.

Further, the light modulator is a liquid-crystal-light-valve-type light modulator.

Further, the stereo projection apparatus with low throw ratio and high light efficiency also comprises a linear polarizer disposed in front of the light modulator and, by filtering, the linear polarizer causes the transmitted light beam, first reflective light beam and second reflective light beam to have the consistent polarization state.

Further, the light modulator is replaced with a quarter wavelength retardation film, and the quarter wavelength retardation film is configured to transform the transmitted light beam, first reflective light beam and second reflective light beam into a 45-degree left-circularly polarized light and a 135-degree right-circularly polarized light.

The present invention further provides a stereo projection system with low throw ratio and high light efficiency, which comprises a projector, a metal screen, and a stereo projection apparatus with low throw ratio and high light efficiency as described above. The projector is configured to project left-eye images and right-eye images in accordance with a frame sequence. The metal screen is configured to form images of the reflective light beams and the transmitted light beam, and paired lights of the left-eye images and right-eye images which are projected onto the metal screen are reflected with an opposite circular polarization state.

The stereo projection system with low throw ratio and high light efficiency of the present invention utilizes the polarized beam splitter assembly to split the incident light into three parts by two polarized beam splitting planes, which effectively reduces the optical path difference between the reflective light and the transmitted light. As a result, the size of the entire device is significantly reduced, and overlapping of the various light beams becomes easier. In addition, the twisted liquid crystal device is used as a device for rotating the polarization direction of the polarized light, which provides a small chromatic dispersion and high efficiency of rotating the polarization direction.

DESCRIPTION OF THE EMBODIMENTS

In order to make the objectives, technical solutions and advantages become more apparent, more detailed description of the present invention is made below with reference to the drawings and embodiments. It is to be understood that the specific embodiments explained herein are intended for the purpose of description only and shall not be used to limit the present invention.

The stereo projection apparatus with low throw ratio and high light efficiency of the present invention utilizes a polarized beam splitter prism set to split an incident light into three light beams with different polarization state, and then utilizes a twisted liquid crystal device to adjust the polarization state of one or two of the three light beams so as to make the three light beams have the same polarization state. Two reflective mirrors or a reflective mirror set are then used to adjust two light beams of the polarized beam splitter to have the same direction as the original incident light. As such, the three light beams overlap with each other on the metal screen. This design can convert about 70% of the light of the projector into polarized light, which increases the light efficiency of the stereo projection apparatus and hence increases the luminance of the projected image. In addition, this design can provide the stereo projection apparatus with a compact structure and low throw ratio and is suitable for projectors having a throw ratio of about 1:1.

Figure 1:
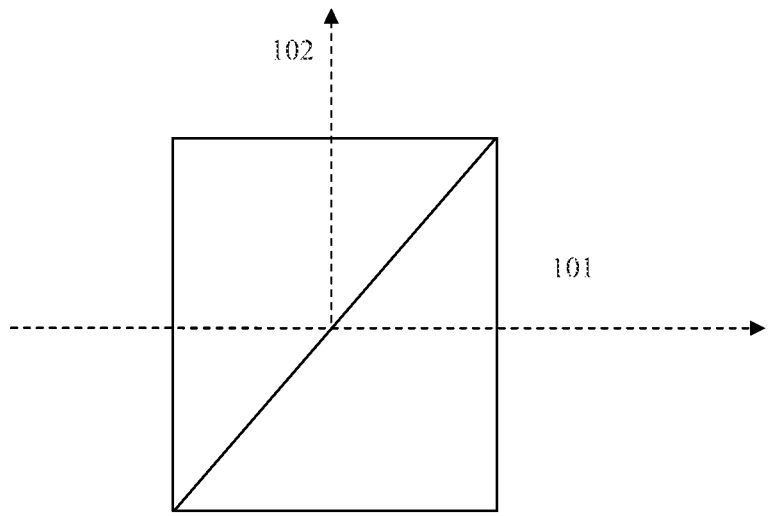
FIG. 1 illustrates a structure and light path of an existing polarized beam splitter prism.
Figure 2:
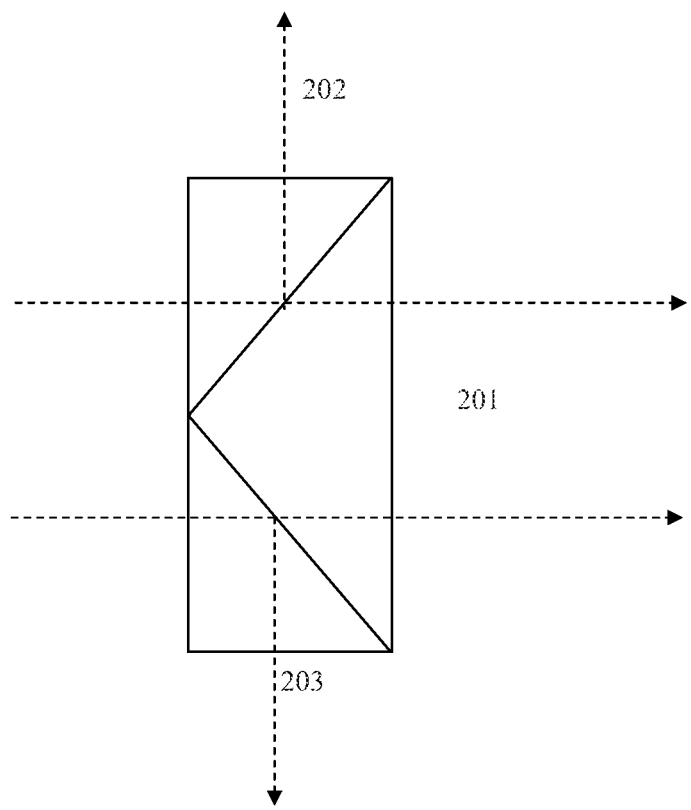
FIG. 2 illustrates a polarized beam splitter prism set and its light path according to the embodiment of the present invention.

A conventional polarized beam splitter prism is shown in FIG. 1. The polarized beam splitter prism includes two 45-degree prisms that are glued to each other and has one polarization splitting plane. A light incident on the polarization splitting plane is split into a transmitted P-state polarization light 101 and a reflective S-state polarization light 102. The present invention redesigns the conventional polarized beam splitter to overcome the shortcomings of the conventional polarized beam splitter. FIG. 2 illustrates the polarized beam splitter prism set according to the present invention, which includes three 45-degree prisms that are attached to each other after a prism coating process. The present polarized beam splitter prism set is rectangular-shaped and has one incident plane and three emitting planes. The present polarized beam splitter prism set has two internal polarization splitting planes that are perpendicular to each other and are both at a 45-degree angle to the incident plane. The two polarization splitting planes intersect at a center line of the incident plane. An incident light is split into a transmitted P-state polarization light 201 and reflective S-state polarization lights 202, 203.

Figure 3:
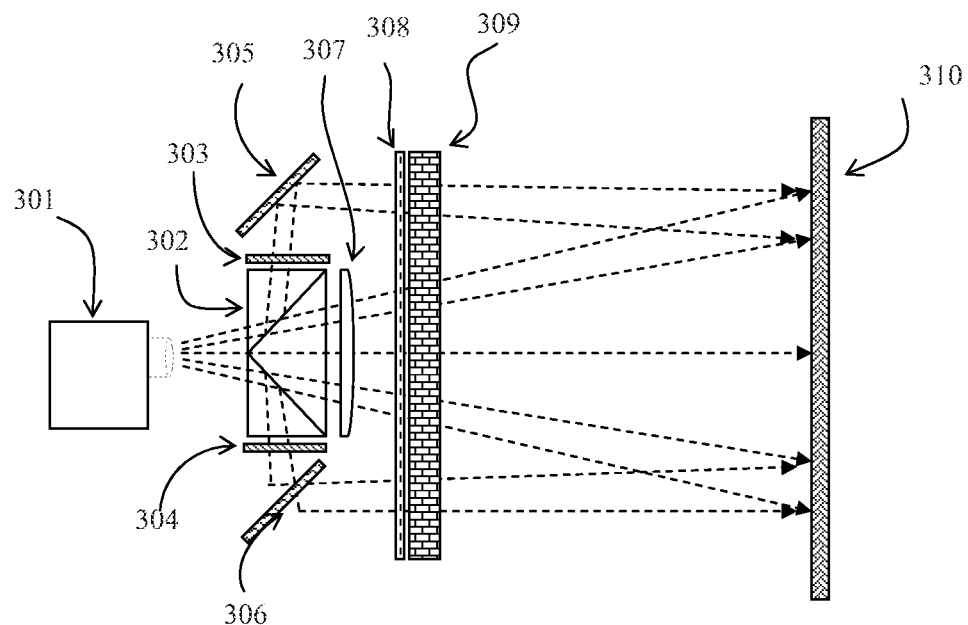
FIG. 3 illustrates an optical structure of the first stereo projection apparatus with low throw ratio and high light efficiency according to the present invention, in which two twisted liquid crystal devices are disposed across the light paths of the two reflective light beams and between polarized beam splitter device and reflective mirrors.

As shown in FIG. 3, the stereo projection apparatus with low throw ratio and high light efficiency of the present invention includes a polarized beam splitter assembly 302, light path direction adjustment assemblies 305 and 306, polarization state transforming assemblies 303 and 304, a light beam size adjustment assembly 307, and a light modulator 309. The polarized beam splitter assembly 302 is used to split an incident light from a lens of a projector 301 into a transmitted light beam 201, a first reflective light beam 202 and a second reflective light beam 203. The transmitted light beam has a P-polarization state, and the two reflective light beams have a S-polarization state. The transmitted light beam and reflective light beams are collectively referred to as polarized lights. The polarized beam splitter assembly 302 splits the light beam of the projector 301 into the transmitted light beam 201, the first reflective light beam 202 and the second reflective light beam 203. The polarization direction of the transmitted light beam 201 is orthogonal to the polarization direction of the first reflective light beam 202 and the second reflective light beam 203. The polarization state transforming assemblies 303 and 304 adjust the polarization state of the transmitted light beam or the polarization state of the first reflective light beam and the second reflective beam, such that the adjusted transmitted light beam, first reflective light beam and second reflective light beam have the same polarization state. The light path direction adjustment assemblies 305 and 306 adjust the travel direction of the transmitted light beam or the travel direction of the first reflective light beam and the second reflective light beam, such that the adjusted transmitted light beam, first reflective light beam and second reflective light beam have the same travel direction. The light beam size adjustment assembly 307 adjusts the coverage range of the transmitted light beam or the coverage range of first reflective light beam and second reflective light beam, such that the projecting image of the adjusted transmitted light beam, first reflective light beam and second reflective light beam have the same size. The light modulator 309 modulates the adjusted transmitted light beam, first reflective light beam and second reflective light beam to left-circularly polarized light and right-circularly polarized light in accordance with a frame sequence. In a first embodiment, the polarization state transforming assemblies 303 and 304 are respectively disposed in the first reflective light beam 202 and the second reflective light beam 203, i.e. adjacent two opposite emitting planes of the polarized beam splitter assembly 302 as shown in FIG. 3, to rotate the polarization state of the reflective light beams 90 degrees to make them consistent with the polarization state of the transmitted light beam. The polarization state transforming assemblies 303 and 304 include at least one twisted liquid crystal device which is usually a 90-degree-twisted TN type liquid crystal device. When the polarization direction of a light incident on the twisted liquid crystal device is parallel or perpendicular to the arrangement direction of the surface layer molecules of the liquid crystal layer of the twisted liquid crystal device, the polarization state of the light passing through the twisted liquid crystal device will be rotated 90 degrees. Increasing a delay value of the twisted liquid crystal device facilitates achieving better polarization state.

In combination with the above embodiments, the light path direction adjustment assemblies 305 and 306 may include two reflective mirrors respectively disposed at opposite sides of the reflective planes of the polarized beam splitter assembly 302, for reflecting the reflective light beams again to make their travel direction consistent with the travel direction of the transmitted light beam and to make the projecting images of the transmitted light beam, first reflective light beam and second reflective light beam on the metal screen overlap with each other by means of an angle adjustment. The polarized beam splitter assembly 302 is a polarized beam splitter prism set. Preferably, the light modulator 309 is a liquid-crystal-light-valve-type light modulator.

In combination with the above embodiments, the stereo projection apparatus with low throw ratio and high light efficiency of the present invention may further include a linear polarizer 308 disposed in front of the light modulator 309. By filtering, the linear polarizer 308 causes the transmitted light beam, first reflective light beam and second reflective light beam to have the consistent polarization state, making the polarized lights even better.

In combination with the above embodiments, the polarization stage transforming assemblies 303 and 304 include at least one twisted liquid crystal device. The twisted liquid crystal device is disposed across the light paths of the first reflective light beam and second reflective light beam and in front of or after the light path adjustment assemblies, or disposed at any location after the light beam size adjustment assembly and in front of the light modulator.

Figure 4:
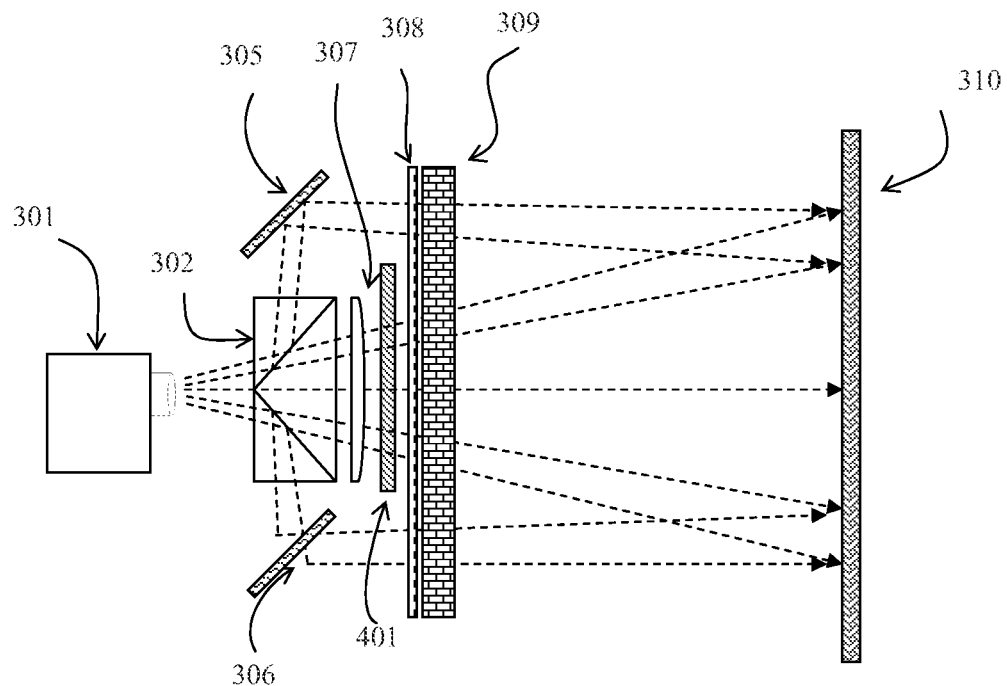
FIG. 4 illustrates an optical structure of the second stereo projection apparatus with low throw ratio and high light efficiency according to the present invention, in which two twisted liquid crystal devices are disposed across the light paths of the transmitted light beams.

In a second embodiment, as shown in FIG. 4, the twisted liquid crystal device is disposed after the polarized beam splitter prism set to adjust the transmitted light beam to have a consistent polarization state with the reflective light beams.

Figure 5:
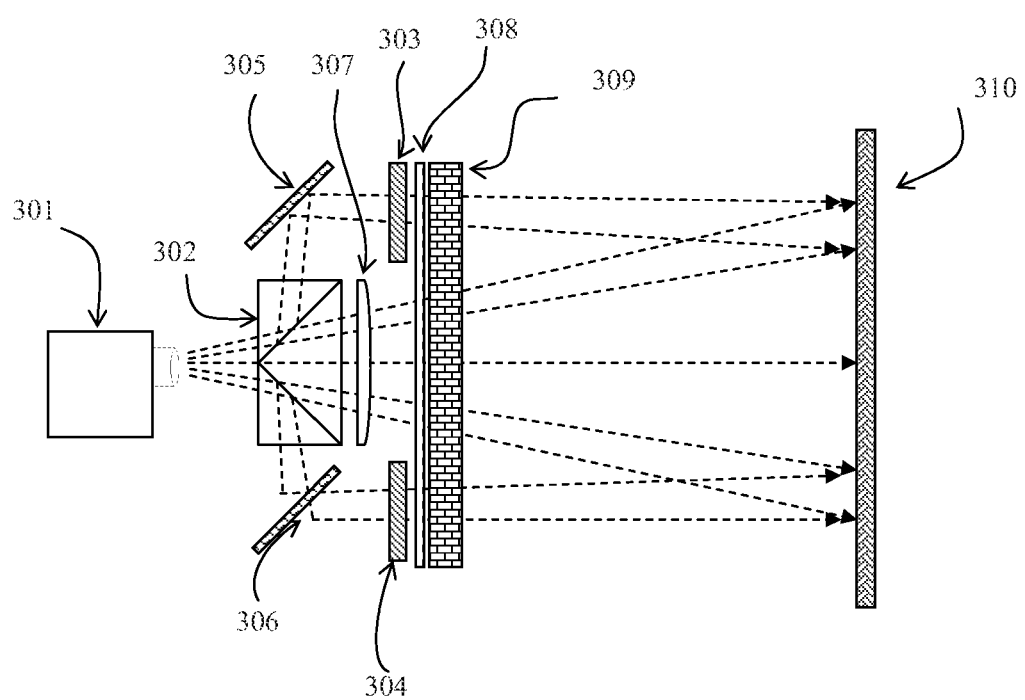
FIG. 5 illustrates an optical structure of the third stereo projection apparatus with low throw ratio and high light efficiency according to the present invention, in which two twisted liquid crystal devices are disposed across the light paths of another two reflective light beams and between the reflective mirrors and linear polarizer.
Figure 1:
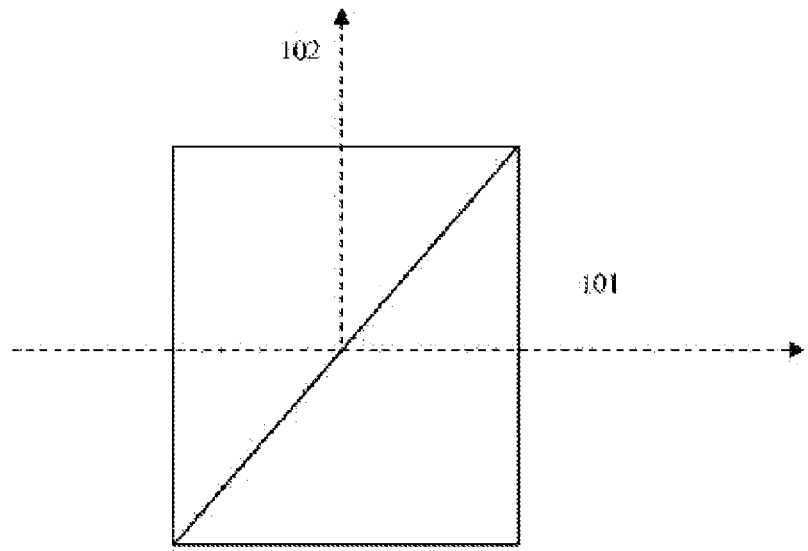
Figure 2:
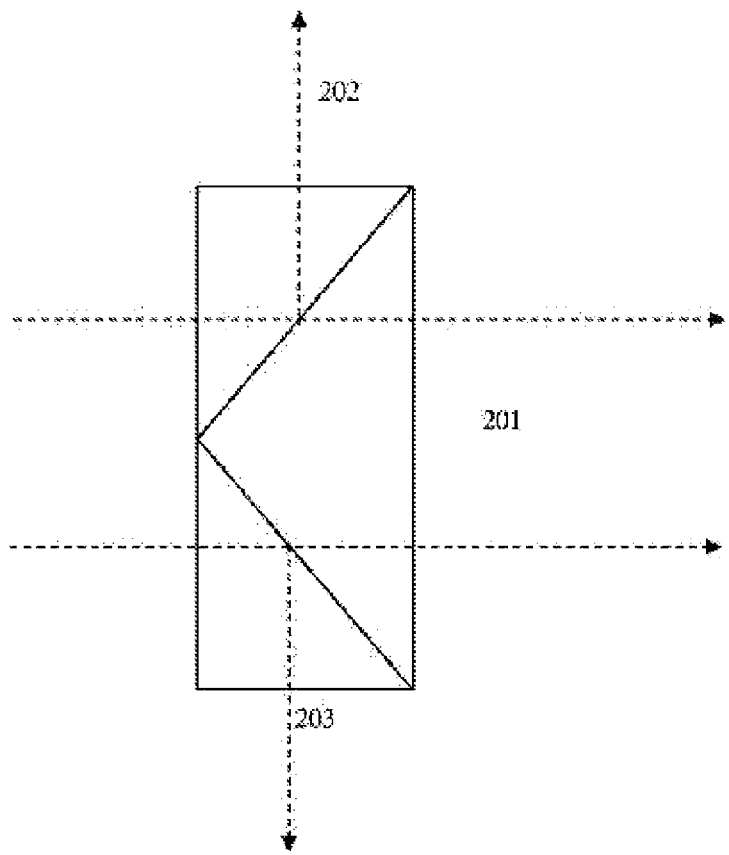
Figure 3:
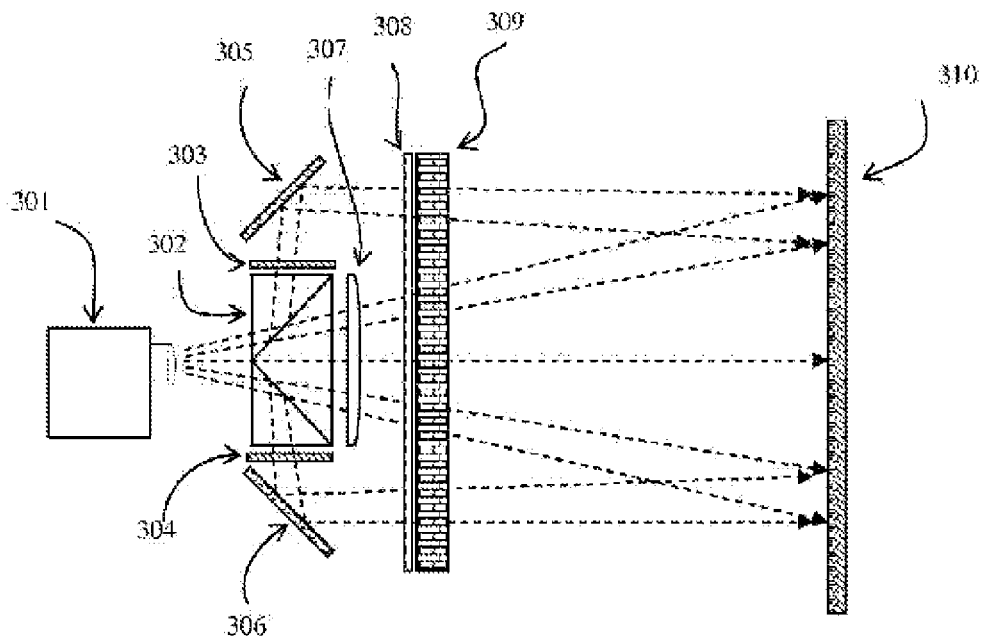
Figure 4:
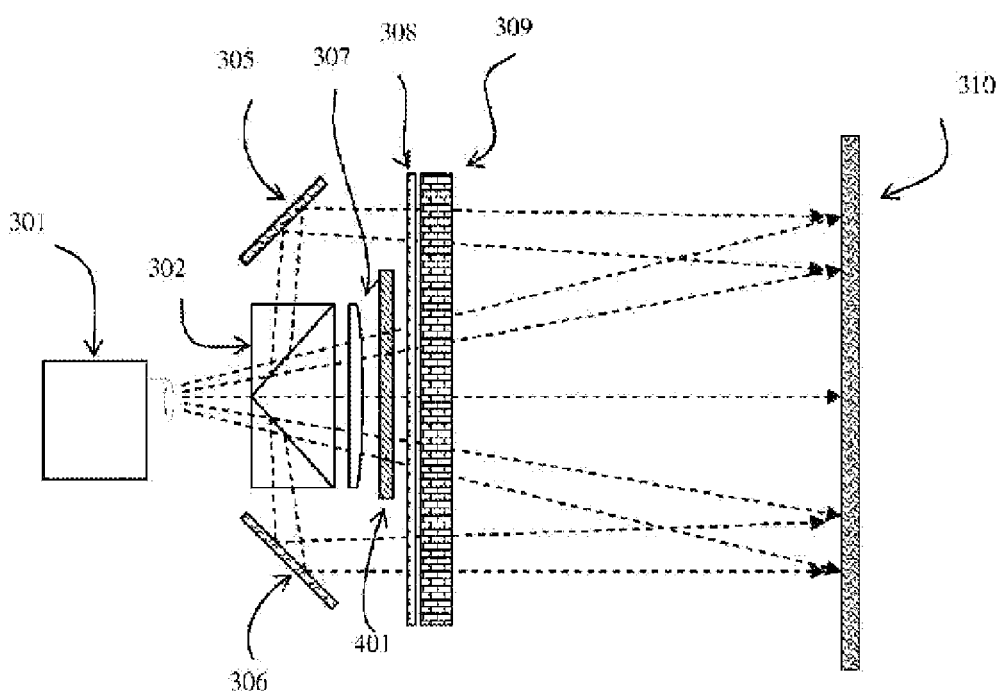
Figure 5:
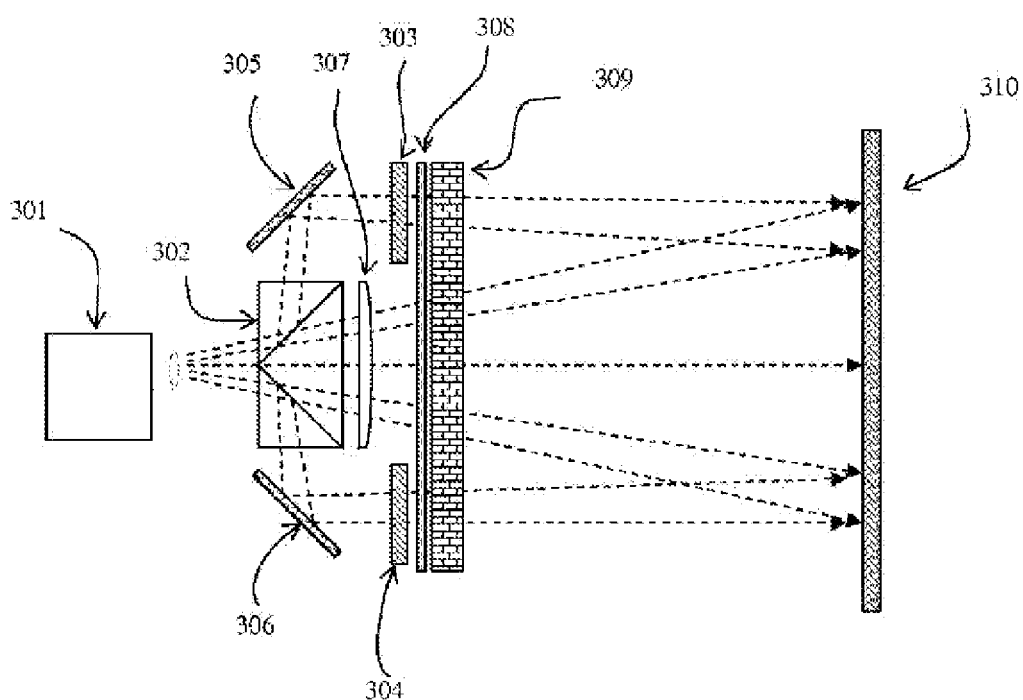

In a third embodiment, as shown in FIG. 5, there are two twisted liquid crystal devices disposed in the reflective light beams. The two twisted liquid crystal devices are respectively disposed between the two reflective mirrors and the linear polarizer 308 to adjust the reflective light beams to have a consistent polarization state with the transmitted light beams.

In combination with the various embodiments above, the twisted liquid crystal device may be a traditional glass-substrate-based liquid crystal device, which consists of a glass substrate, transparent conductor layer, alignment layer, spacer, sealing material, liquid crystal material. The twisted liquid crystal device may also be a flexible-plastic-substrate-based liquid crystal device, which consists of a plastic substrate, transparent conductor layer, alignment layer, spacer, sealing material, liquid crystal material. The twisted liquid crystal device may also be a macromolecule liquid crystal film based on polymer technology, such as, Twistar™ film produced by DERMA company. It is to be understood that liquid crystal devices with twisted structure all fall within the scope of the present invention.

The light beam size adjustment assembly 307 includes at least one lens or lens group. The lens or lens group is disposed at any location on the light paths of the transmitted light beam, first reflective light beam and second reflective light beam. The lens or lens group acts to expand or narrow the light beam in which it is disposed, such that the projecting image of the light beam on the metal screen 310 has the same size as the projecting image of other light beams. The lens or lens group can be disposed at various locations. Specifically, the lens or lens group is disposed after the polarized beam splitter prism set, i.e. between the polarized beam splitter prism set and the linear polarizer 308, to expand the transmitted light beam, such that the projecting image of the transmitted light beam on the metal screen 310 has the same size as the projecting images of the reflective light beams. Alternatively, the lens or lens group is disposed after the two reflective mirrors, respectively, to narrow the reflective light beams, such that the projecting images of the reflective light beams on the metal screen 310 have the same size as the projecting image of the transmitted light beam. Alternatively, the lens or lens group may also be disposed between the light modulator 309 and the metal screen 310. However, in order to avoid the affect of reflecting activities on the lens surface to the polarization state, the lens or lens group is usually disposed between the polarization beam splitter assembly 302 and the linear polarizer 308.

In combination with the various embodiments above, the light modulator is replaced with a quarter wavelength retardation film. The quarter wavelength retardation film is disposed after the linear polarizer to transform the polarized light passing through the linear polarizer into a 45-degree left-circularly polarized light and a 135-degree right-circularly polarized light.

In various embodiments described above, the linear polarizer 308 is an independent component such that the transmitted light beam and the reflective light beams all pass through the linear polarizer 308. In practice, the single linear polarizer 308 may be replaced with three smaller-sized linear polarizers which are disposed in the first reflective light beam, the second reflective light beam and the transmitted light beam, respectively. Similarly, the light modulator 309 is an independent component in various embodiments described above. In practice, the light modulator 309 may also be replaced with three smaller-sized liquid-crystal-light-valve-type light modulators which are disposed in the first reflective light beam, the second reflective light beam and the transmitted light beam, respectively.

According to the stereo projection apparatus with low throw ratio and high light efficiency, the present invention additionally provides a stereo projection system with low throw ratio and high light efficiency, which includes a projector 301, a metal screen 310, and the stereo projection apparatus with low throw ratio and high light efficiency as described above. The projector 301 projects the left-eye images and the right-eye images in accordance with the frame sequence. The metal screen 310 is used to form the images of the reflective light beams and the transmitted light beam and reflect, with an opposite circular polarization state, the light projected onto the metal screen 310, such that the right-eye image and left-eye image are kept separate before the light enters the circularly polarized eyeglasses that the user wears, thereby avoiding crosstalk between the left- and right-eye images. The viewer wearing the circularly polarized eyeglasses can thus see the stereo images. Left- and right-eye lenses of the circularly polarized eyeglasses are respectively left-circularly polarized lens and right-circularly polarized lens, which can separate the light reflected by the metal screen, such that the images entering the left and right eyes are different, thereby separating the left-eye image from the right-eye image.

The above are only the apparent embodiments of the present invention, which will not be used to restrict the scope of the present invention. It is intended that any modifications, the equivalents or promotion is covered in the scope of the present invention provided that they are in accord with the spirits or principle of the invention.

What is claimed is:

1. A stereo projection apparatus with low throw ratio and high light efficiency, comprising:
   a polarized beam splitter assembly configured to split a projecting light beam of a projector into a transmitted light beam, a first reflective light beam and a second reflective light beam, the polarization direction of the transmitted light beam being orthogonal to the polarization direction of the first reflective light beam and the second reflective light beam;
   a polarization state transforming assembly configured to adjust the polarization state of the transmitted light beam or the polarization state of the first reflective light beam and the second reflective beam, such that the adjusted transmitted light beam, first reflective light beam and second reflective light beam have the same polarization state;
   a light path direction adjustment assembly configured to adjust a travel direction of the transmitted light beam or a travel direction of the first reflective light beam and the second reflective light beam, such that the adjusted transmitted light beam, first reflective light beam and second reflective light beam have the same travel direction;
   a light beam size adjustment assembly configured to adjust a coverage range of the transmitted light beam or a coverage range of the first reflective light beam and the second reflective light beam, such that projecting images of the adjusted transmitted light beam, first reflective light beam and second reflective light beam have the same size; and
   one of a light modulator and a quarter wavelength retardation film, the light modulator configured to modulate the adjusted transmitted light beam, first reflective light beam and second reflective light beam to left-circularly polarized light and right-circularly polarized light in accordance with a frame sequence, the quarter wavelength retardation film configured to transform the transmitted light beam, first reflective light beam and second reflective light beam into a 45-degree left-circularly polarized light and a 135-degree right-circularly polarized light.

2. The stereo projection apparatus with low throw ratio and high light efficiency according to claim 1, wherein the polarized beam splitter assembly comprises a polarized beam splitter prism set, the polarized beam splitter prism set comprises three 45-degree prisms that are attached to each other after a prism coating process, the polarized beam splitter prism set is rectangular-shaped and comprises one incident plane and three emitting planes, there are two polarization splitting planes inside the polarized beam splitter prism set, the two polarization splitting planes are perpendicular to each other and both are at an 45-degree angle to the incident plane, and the two polarization splitting planes intersect at a center line of the incident plane.

3. The stereo projection apparatus with low throw ratio and high light efficiency according to claim 1, wherein the polarization state transforming assembly comprises at least one twisted liquid crystal device; the twisted liquid crystal device is disposed across the light paths of the first reflective light beam and second reflective light beam and in front of or after the light path adjustment assembly, or disposed at any location between the light beam size adjustment assembly and the light modulator, or disposed at any location between the light beam size adjustment assembly and the quarter wavelength retardation film.

4. The stereo projection apparatus with low throw ratio and high light efficiency according to claim 3, wherein the twisted liquid crystal device is one of a glass-substrate-based liquid crystal device, a flexible-plastic-substrate-based liquid crystal device, and a macromolecule liquid crystal film based on polymer technology.

5. The stereo projection apparatus with low throw ratio and high light efficiency according to claim 1, wherein the light path direction adjustment assembly comprises two reflective mirrors respectively disposed on light paths of the first reflective light beam and the second reflective light beam.

6. The stereo projection apparatus with low throw ratio and high light efficiency according to claim 1, wherein the light beam size adjustment assembly comprises at least one lens or lens group, the lens or lens group is disposed at any location on light paths of the transmitted light beam, first reflective light beam and second reflective light beam.

7. The stereo projection apparatus with low throw ratio and high light efficiency according to claim 1, wherein the light modulator is a liquid-crystal-light-valve-type light modulator.

8. The stereo projection apparatus with low throw ratio and high light efficiency according to claim 1, wherein the stereo projection apparatus with low throw ratio and high light efficiency further comprises a linear polarizer disposed in front of the light modulator or the quarter wavelength retardation film and, by filtering, the linear polarizer causes the transmitted light beam, first reflective light beam and second reflective light beam to have the consistent polarization state.

9. A stereo projection system with low throw ratio and high light efficiency, comprising a projector, a metal screen, and a stereo projection apparatus with low throw ratio and high light efficiency; the stereo projection apparatus with low throw ratio and high light efficiency, comprising:
   a polarized beam splitter assembly configured to split a projecting light beam of a projector into a transmitted light beam, a first reflective light beam and a second reflective light beam, the polarization direction of the transmitted light beam being orthogonal to the polarization direction of the first reflective light beam and the second reflective light beam;
   a polarization state transforming assembly configured to adjust the polarization state of the transmitted light beam or the polarization state of the first reflective light beam and the second reflective beam, such that the adjusted transmitted light beam, first reflective light beam and second reflective light beam have the same polarization state;
   a light path direction adjustment assembly configured to adjust a travel direction of the transmitted light beam or a travel direction of the first reflective light beam and the second reflective light beam, such that the adjusted transmitted light beam, first reflective light beam and second reflective light beam have the same travel direction;
   a light beam size adjustment assembly configured to adjust a coverage range of the transmitted light beam or a coverage range of the first reflective light beam and the second reflective light beam, such that projecting images of the adjusted transmitted light beam, first reflective light beam and second reflective light beam have the same size; and one of a light modulator and a quarter wavelength retardation film, the light modulator configured to modulate the adjusted transmitted light beam, first reflective light beam and second reflective light beam to left-circularly polarized light and right-circularly polarized light in accordance with a frame sequence, the quarter wavelength retardation film configured to transform the transmitted light beam, first reflective light beam and second reflective light beam into a 45-degree left-circularly polarized light and a 135-degree right-circularly polarized light;

the projector configured to project left-eye images and right-eye images in accordance with a frame sequence;

the metal screen configured to form images of the reflective light beams and the transmitted light beam, and paired lights of the left-eye images and right-eye images which are projected onto the metal screen being reflected with an opposite circular polarization state.

10. The stereo projection system with low throw ratio and high light efficiency according to claim 9, wherein the polarized beam splitter assembly comprises a polarized beam splitter prism set, the polarized beam splitter prism set comprises three 45-degree prisms that are attached to each other after a prism coating process, the polarized beam splitter prism set is rectangular-shaped and comprises one incident plane and three emitting planes, there are two polarization splitting planes inside the polarized beam splitter prism set, the two polarization splitting planes are perpendicular to each other and both are at an 45-degree angle to the incident plane, and the two polarization splitting planes intersect at a center line of the incident plane.

11. The stereo projection system with low throw ratio and high light efficiency according to claim 9, wherein the polarization state transforming assembly comprises at least one twisted liquid crystal device; the twisted liquid crystal device is disposed across the light paths of the first reflective light beam and second reflective light beam and in front of or after the light path adjustment assembly, or disposed at any location between the light beam size adjustment assembly and the light modulator, or disposed at any location between the light beam size adjustment assembly and the quarter wavelength retardation film.

12. The stereo projection system with low throw ratio and high light efficiency according to claim 11, wherein the twisted liquid crystal device is one of a glass-substrate-based liquid crystal device, a flexible-plastic-substrate-based liquid crystal device, and a macromolecule liquid crystal film based on polymer technology.

13. The stereo projection system with low throw ratio and high light efficiency according to claim 9, wherein the light path direction adjustment assembly comprises two reflective mirrors respectively disposed on light paths of the first reflective light beam and the second reflective light beam.

14. The stereo projection system with low throw ratio and high light efficiency according to claim 9, wherein the light beam size adjustment assembly comprises at least one lens or lens group, the lens or lens group is disposed at any location on light paths of the transmitted light beam, first reflective light beam and second reflective light beam.

15. The stereo projection system with low throw ratio and high light efficiency according to claim 9, wherein the light modulator is a liquid-crystal-light-valve-type light modulator.

16. The stereo projection system with low throw ratio and high light efficiency according to claim 9, wherein the stereo projection apparatus with low throw ratio and high light efficiency further comprises a linear polarizer disposed in front of the light modulator or the quarter wavelength retardation film and, by filtering, the linear polarizer causes the transmitted light beam, first reflective light beam and second reflective light beam to have the consistent polarization state.

* * * * *

UNITED STATES PATENT AND TRADEMARK OFFICE
CERTIFICATE OF CORRECTION

Page 1 of 4

PATENT NO. : 9,638,926 B2
APPLICATION NO. : 14/580769
DATED : May 2, 2017
INVENTOR(S) : Yanlong Li et al.

It is certified that error appears in the above-identified patent and that said Letters Patent is hereby corrected as shown below:

In the Drawings

Replace drawing sheets 1, 2, and 3 of 3, consisting of Fig. 1 through Fig. 5, with the attached drawing sheets.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*